United States Patent [19]

Koenig et al.

[11] Patent Number: 4,511,969

[45] Date of Patent: Apr. 16, 1985

[54] CONTROL CHANNEL INTERFACE CIRCUIT

[75] Inventors: Mark J. Koenig, Middlesex; Kevin J. Oye, Holmdel, both of N.J.

[73] Assignee: AT&T Information Systems Inc., Holmdel, N.J.

[21] Appl. No.: 496,483

[22] Filed: May 20, 1983

[51] Int. Cl.³ .......................... G06F 15/16; H04J 3/00
[52] U.S. Cl. ..................................... 364/200; 370/85
[58] Field of Search ................... 364/200, 900; 370/85, 370/89, 92; 179/18 ES

[56] References Cited

U.S. PATENT DOCUMENTS

| | | | |
|---|---|---|---|
| 3,632,881 | 1/1972 | Graham | 370/89 |
| 3,921,137 | 11/1975 | McClearn, Jr. et al. | 370/89 X |
| 3,932,841 | 1/1976 | Deerfield et al. | 364/200 |
| 3,963,870 | 6/1976 | Couder et al. | 179/18 ES X |
| 4,161,786 | 7/1979 | Hopkins et al. | 370/85 X |
| 4,223,380 | 9/1980 | Antonaccio et al. | 364/200 |
| 4,251,880 | 2/1981 | Baugh et al. | 370/89 X |
| 4,280,217 | 7/1981 | Hafer et al. | 179/18 ES X |
| 4,379,950 | 4/1983 | Ahmed | 179/18 ES |
| 4,442,502 | 4/1984 | Friend et al. | 364/900 |

Primary Examiner—Gareth D. Shaw
Assistant Examiner—Ronni S. Malamud
Attorney, Agent, or Firm—Frederick B. Luludis

[57] ABSTRACT

There is disclosed a control channel interface circuit for interfacing a port processor of a distributed multiprocessor communication system to a common time division multiplexed bus. The detection, extraction and synchronization of control messages passed between a central processor and port processor via a TDM bus are handled by the interface unit thereby relieving a port processor of this burden. A group of control time slots within a system frame are dedicated for the transfer of control messages between port processors and a central processor. The interface unit also monitors the operability of a respective port processor and automatically disables a faulty processor.

21 Claims, 8 Drawing Figures

FIG. 8

| INPUTS | STATES | | | | | | | | | |
|---|---|---|---|---|---|---|---|---|---|---|
| MSA  | 0 | 0 | 1 | 1 | 0 | 0 | 1 | 0 | 1 | 0 |
| MADA | 1 | 0 | - | - | 0 | 0 | - | 0 | - | 0 |
| LADA | 1 | 0 | - | - | 0 | 0 | - | 0 | - | 0 |
| MSB  | 0 | 0 | 0 | 0 | 1 | 1 | 0 | 1 | 0 | 1 |
| MADB | 0 | 1 | 0 | 0 | 1 | 1 | 0 | 1 | 0 | 1 |
| LADB | 0 | 1 | 0 | 0 | - | - | 0 | - | 0 | - |
| ACTA | - | - | 0 | 0 | 0 | 0 | 1 | 0 | 0 | 0 |
| ACTB | - | - | 0 | 0 | 0 | 0 | 0 | 1 | 0 | 0 |
| SNA  | - | - | 1 | 0 | 0 | 0 | 0 | 0 | 0 | 0 |
| SNB  | - | - | 0 | 0 | 1 | 0 | 0 | 0 | 0 | 0 |
| RPA  | - | - | 0 | 1 | 0 | 0 | 0 | 0 | 0 | 0 |
| RPB  | - | - | 0 | 0 | 0 | 1 | 0 | 0 | 0 | 0 |

| OUTPUTS | STATES | | | | | | | | | |
|---|---|---|---|---|---|---|---|---|---|---|
| INT  | 0 | 0 | 1 | 1 | 1 | 1 | 1 | 1 | 0 | 0 |
| ACO  | 1 | 1 | 0 | 0 | 0 | 0 | 0 | 0 | 0 | 0 |
| ACAN | 0 | 1 | - | - | - | - | - | - | - | - |
| ACS  | 0 | 0 | 1 | 1 | 1 | 1 | 1 | 1 | 1 | 1 |
| ENS  | 1 | 1 | 0 | 0 | 0 | 0 | 0 | 0 | 0 | 0 |
| ENA  | 0 | 1 | 1 | 1 | 1 | 1 | 1 | 1 | 1 | 1 |
| ENB  | 1 | 0 | 1 | 1 | 1 | 1 | 1 | 1 | 1 | 1 |
| ASCN | 0 | 0 | 1 | 1 | 0 | 0 | 1 | 0 | 0 | 0 |
| ASCP | 0 | 0 | 1 | 1 | 0 | 0 | 1 | 0 | 0 | 0 |
| BSCN | 0 | 0 | 0 | 0 | 1 | 1 | 0 | 1 | 0 | 0 |
| BSCP | 0 | 0 | 0 | 0 | 1 | 1 | 0 | 1 | 0 | 0 |
| SCN  | 0 | 0 | 1 | 1 | 1 | 1 | 1 | 1 | 1 | 1 |
| SNT  | 0 | 0 | 0 | 0 | 0 | 0 | 0 | 0 | 1 | 1 |
| SNS  | 0 | 0 | 1 | 0 | 1 | 0 | 0 | 0 | 0 | 0 |
| PCT  | 0 | 0 | 0 | 0 | 0 | 0 | 1 | 1 | 0 | 0 |
| PSA  | 0 | 0 | 1 | 0 | 1 | 0 | 0 | 0 | 0 | 0 |
| ACA  | 1 | 0 | 0 | 0 | 0 | 0 | 0 | 0 | 0 | 0 |
| ACB  | 0 | 1 | 0 | 0 | 0 | 0 | 0 | 0 | 0 | 0 |
| LRS  | 0 | 0 | 0 | 1 | 0 | 1 | 0 | 0 | 0 | 0 |

CONTROL CHANNEL INTERFACE CIRCUIT

The present invention relates to distributed processor systems and more particularly relates to interfacing a microprocessor controlled port circuit to a distributed processor communication system time division bus.

BACKGROUND OF THE INVENTION

The art of distributed processing in which data processing is shared between a central processor and a group of local processors is now being applied to digital telephone business customer systems. In such systems, information is typically exchanged between a central processor and a local processor via a conventional synchronous type data bus. A bus contention scheme administered by the central processing unit or administered locally by each distributed processor is invoked to prevent information placed on the bus by one local processor from colliding with information placed on the same bus by a second local processor. In such schemes a local processor may employ a bus management arrangement to gain access to the bus, for example recognizing its signature or address on the bus for the reception of information. Typically, a bus management arrangement is interleaved with information processing to maintain synchronization with bus timing signals.

Bus administration arraangements, while orderly, reduce the real time processing capability of a local processor. For business communication systems, a reduction in real time is adverse to the concept of distributed processor systems implemented for the purpose of enhancing real time data processing capability through distributed processing. Consequently, the number of communication port circuits managed by a local processor would have to be reduced to offset the real time loss imposed by a bus administration arrangement.

The real time processing capability of a distributed processor communication system is further degraded by programmed maintenance tasks which monitor the health of local processors. For a large communication system, the running of maintenance tasks could consume an appreciable portion of the system's real time. This problem is especially aggravated when a faulty local processor impairs common equipment, such as a system bus. Under such circumstances there may be a need to suspend data or call processing in order to invoke fault recognition tasks to identify the faulty processor and isolate it by removing it from service.

Various schemes aimed at relieving a processor of the burden of managing a bus and of providing sanity control have been proposed. However, such schemes appear to be limited to organizing bus access on a priority basis or providing a common pool of memory shared by a local processor and a central processor.

For example, the distributed multiprocessor communication system disclosed in U.S. Pat. No. 4,223,380 issued to J. C. Antonaccio et al, describes an arrangement for relieving a central processing system of the burden of interprocessor bus management. The Antonaccio bus management scheme essentially dedicates a portion of a system time frame to each system processor module in order to transmit information. Interprocessor communication is acknowledged by a receiving processor by transmitting an acknowledgement signal upon receiving information via a interprocessor bus. The Antonaccio system is limited in that it provides no provision for locally detecting and isolating a faulty processor module which is corrupting the information transmitted via the interprocessor bus. Further, the Antonaccio system is not applicable to large communication systems in which real time processing is critical since each processor module has dedicated to it a portion of each time frame for transmission whether or not it has information to transmit. While this is advantageous for guaranteeing that each processor module will have equal access to the system bus it is an inefficient use of bus capacity and therefore is appropriate only for small communication systems using a small number of distributed processors.

Accordingly, it is desired to provide a control channel interface for a time multiplexed communication system which relieves a local processor of the burden of bus management by making the synchronous nature of the bus effectively asynchronous. The channel interface should also isolate a faulty local processor while also making more efficient use of a common bus than prior arrangements.

SUMMARY OF THE INVENTION

We have designed a control channel interface circuit having a state driven controller which monitors selected time slots of a dual system bus for the detection, extraction and transmission of control information between a local processor or microprocessor controller and a central call processor.

A group of control time slots of each system frame are reserved for the passsage of control messages between a call processor and a control channel interface circuit. Each control channel interface circuit monitors the system bus and removes address information from the bus during time slot zero. An address can be either the address of a particular control channel interface circuit (board address) or the address of a group of interface circuits (group address).

If a control channel interface circuit recognizes its board address on the bus during time slot zero it accepts information contained on the bus during succeeding time slots 1–4. Information extracted from the bus during control time slots (0–4) is stored in an input buffer which is accessed by an associated microprocessor controller.

A group address is the means by which a call processor polls a group of microprocessor controllers via associated control channel interface circuits for obtaining control messages from particular microprocessors (activity request).

Microprocessor control information that is to be sent uplink to a call processor is stored in a control channel interface circuit output buffer. Upon being polled by a call processor, each control channel interface circuit of the group polled and having uplink information responds to the call processor by transmitting a one bit reply during the succeeding time slot two.

Thereafter, a call processor notifies each control channel interface to transmit uplink by placing the board address of the polled circuit and coded request words on the system bus during time slots 0-2, respectively. Thereafter, a control channel interface circuit unloads the contents of its output buffer onto the system bus during time slots 2–4 upon recognizing its address during time slot 0.

We have also incorporated into our design circuitry which monitors the operability of an associated microprocessor controller and prevents the controller from accessing the system bus when it becomes inoperable.

The extraction of bus information continues during the inoperability of the local microprocessor in order to obtain instructions from a central processor, such as an instruction directing the channel interface circuit to restart the microprocessor.

BRIEF DESCRIPTION OF THE DRAWING

The operation and implementation of the present invention will be more fully apparent from the following description of the drawing, in which:

FIG. 8 is a state table for the state driven controller shown in FIG. 3.

GENERAL DESCRIPTION

The invention described herein may be advantageously incorporated into a distributed processor system having a common time division multiplexed (TDM) bus. For example, copending U.S. patent application Ser. No. 496,484 of R. H. Astmann filed concurrently herewith and which is hereby incorporated by reference, shows one such example of a distributed processor system which employs our invention.

Figure 1:
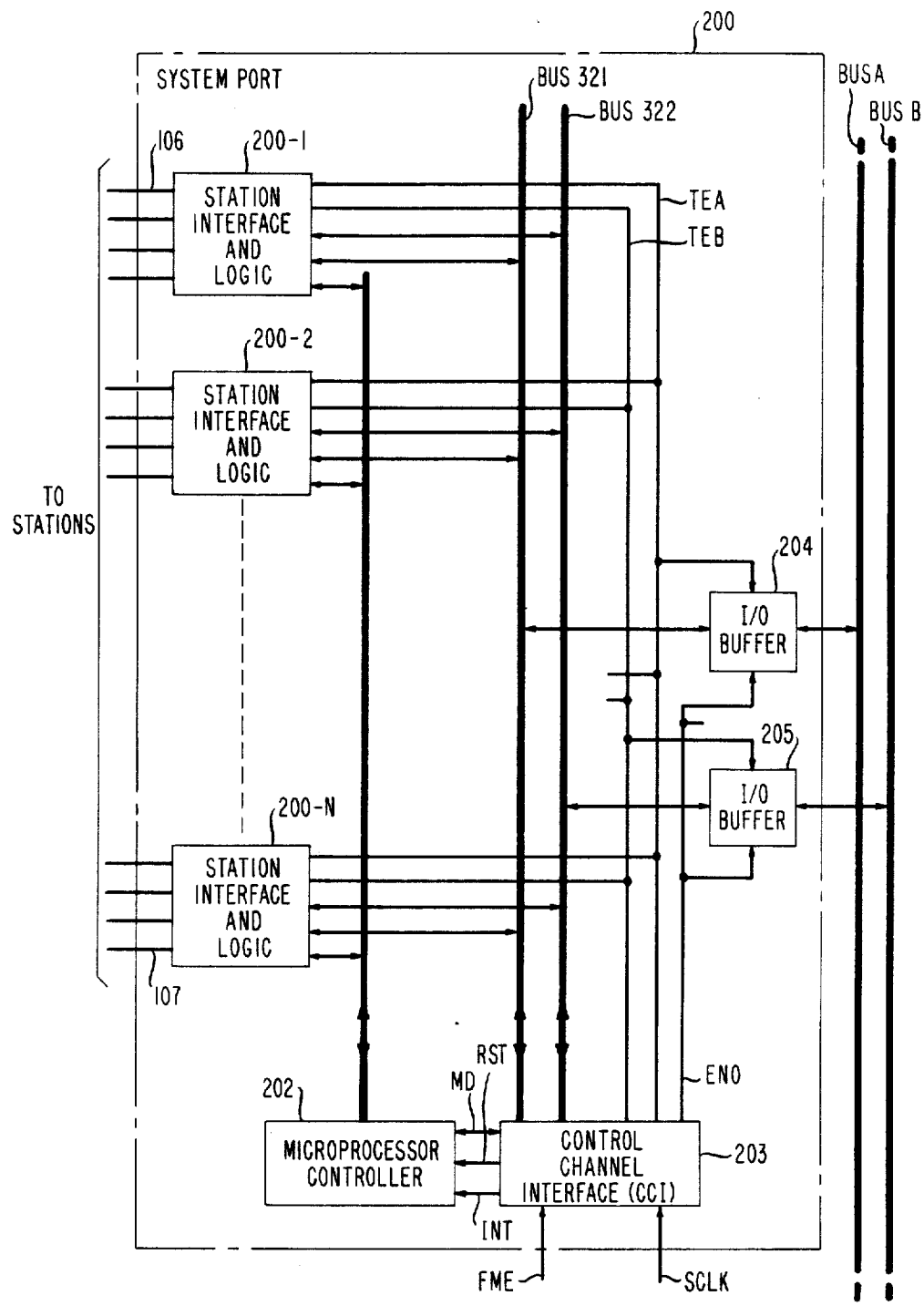
FIG. 1 is an illustration of a communication system port in which the invention is advantageously used.

Referring to FIG. 1, there is illustrated a number of terminals, such as telephone stations, served by a system port 200 under control of a microprocessor controller 202. Each port station circuit 200-1 through 200-N communicates with a call processor (not shown) via TDM Bus A or TDM Bus B.

As shown control channel interface (CCI) circuit 203, which is the object of the invention disclosed herein, allows port microprocessor 202 to communicate internally over either bus 321 or 322 and via either bus A or bus B to an external call processor.

Figure 2:
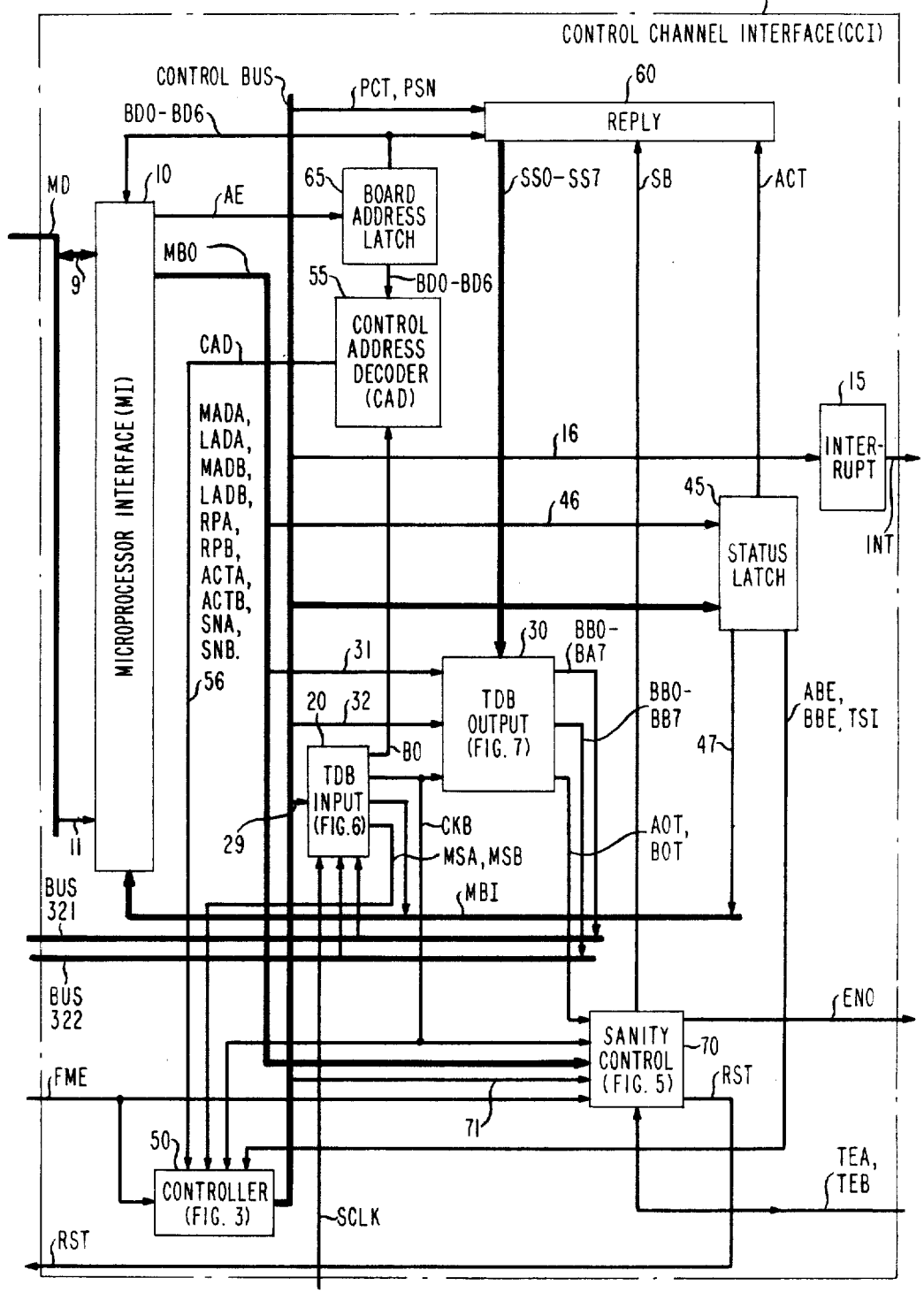
FIG. 2 illustrates one embodiment of the invention in block diagram form.

FIG. 2 illustrates a control channel interface circuit 203 which asynchronously communicates with microprocessor 202 via microprocessor interface 10 and synchronously communicates with either TDM data bus 321 or bus 322 via TDB input 20. Microprocessor interface 10 (hereinafter referred to as MI 10) includes circuitry, explained more fully herein, for interfacing microprocessor controller 202 (FIG. 1) with control interface 203 circuit modules, such as, for example, address latch 65 and status latch 45. MI 10 further includes circuitry for passing data from input latch circuit TDBI 20 in 6 bytes of 8 bits in length via multilead bus MBI to microprocessor controller 202. Microprocessor interface 10 also transfers control information from microprocessor controller 202 to TDM output latch 30 for uplink transmission via bus 321 or bus 322 to a call processor (not shown) when requested. Microprocessor controller 202 notifies control channel interface 203 of this activity by setting a special bit (ACT) in status latch 45 via MI circuit 10. In this manner, interface circuit 203 responds to call processor activity requests in accordance with the state of the status latch 45 activity bit (ACT). In addition to message activity, microprocessor controller 202 also requests the status of other circuit activity, such as sanity or operability from MI10, which will be more fully described herein.

A call processor obtains microprocessor controller 202 messages by polling a group of control channel interface circuits 203 simultaneously via TDM bus 321 or bus 322. Polling (group activity) requests are sent a call processor (not shown) during time slot zero (TS0) of system TDM bus A and bus B and are distinguished from other types of TS0 address information by the setting of the most significant bit (bit 7) of bus 321 or bus 322 to a logic one. The group of control channel interface circuits 203 to which the activity request is addressed appears in bit positions 3–6. Bit positions 0–2 identify the type of call processor request.

In order to communicate with a particular control channel interface circuit 203 for the passsage of control information, a call processor transmits that circuit's board address during time slot zero. For example, when a call processor is prepared to receive uplink control messages the particular TS0 board address of a CCI 203 is followed by two control messages appearing on bus 321 or bus 322 during time slots 2 and 3, respectively. Thereafter, during succeeding time frames, control channel interface 203 transfers microprocessor controller 202 control messages stored in TDB output latch 30 to TDM bus 321 or bus 322 during time slots 2 to 4, respectively. The first control uplink message transferred to bus 321 or bus 322 by interface circuit 203 identifies the number of uplink messages to be sent. In this manner, a call processor is alerted to the number of control messages that it should expect to receive from interface 203.

Synchronization of each control channel interface circuit 203 activity with TDB bus 321 or bus 322 timing is obtained by supplying to each CCI 203 a system frame pulse and a two megahertz clock signal via leads FME and SCLK respectively from a call processor. In response to a system frame and clock pulses, controller circuit 50 generates time slots 0–6 within a system frame corresponding to the occurrence of time slots 0–6 on bus 321 or bus 322 for synchronous reception and transmission of control information to and from bus 321 or bus 322.

The transmission and reception of control messages to and from bus 321 or bus 322 is controlled by controller 50. For example, controller 50 generates a series of signals which direct TDB output 30 as to which bus 321 or bus 322 circuit 203 should transmit to and as to which type of reply that should be transmitted in response to a call processor activity query (request). The type of reply is provided by decoder 55 to controller 50 upon decoding a call processor activity request. In the event the request is for uplink control messages controller 50 directs reply circuit 60 to form an activity reply in accordance with, for example, the logic state of the message activity bit (ACT) stored in status latch 45. The reply formed by reply circuit 60 is latched into TDB0 30 for transmission to bus 321 or bus 322 during the next frame time slot two.

A reply to a call processor activity request, for example, an uplink message request, is a single bit of logic zero occupying a bit position on bus 321 or bus 322 corresponding to the local address. In this manner, control channel interface circuits 203 of the same group and having uplink messages to transmit simultaneously reply to a call processor polling request by clearing respective bus 321 or bus 322 address oriented bits during time slot two.

Upon recognizing its address on bus 321 or bus 322, controller 50 causes interrupt circuit 15 to interrupt microprocessor controller 202 via lead INT (FIGS. 1 and 2). An interrupt automatically occurs whenever interface circuit 203 receives an invalid call processor request or whenever the address of circuit 203 is received via bus 321 or bus 322 during time slot zero. Microprocessor controller 202 can also request interface circuit 203 to generate an interrupt signal when a new system frame starts.

Sanity control circuit 70 and controller 50 monitor the operability of microprocessor controller 202 and the integrity of TDM bus 321 or bus 322. For example, sanity control circuit 70 places bus buffers 204 and 205 in a read only mode via lead ENO (FIG. 1) upon detecting an inoperable microprocessor controller 202 thereby preventing the possibility of corrupting system bus A or bus B via bus 321 or bus 322, respectively. Control circuit 70 also imposes a transmission inhibit on bus buffers 204 and 205, via lead ENO whenever it detects that a system port element, such as station interface and logic circuit 200-1, is transmitting to buffers 204 or 205 via bus 321 or bus 322 during special control time slots reserved for the transmission of control information.

DETAILED DESCRIPTION

Still referring to FIG. 2, microprocessor interface circuit 10 is a combinational circuit consisting of D-type flip-flops which form a data input register capable of storing eight bits. Microprocessor interface circuit 10 also includes circuitry for communicating with local processor 202 via multiple lead bus MD in accordance with the protocol established for the INTEL 8051 microcomputer described in the 1981 INTEL component catalog at pages 5-23 and 5-35.

Bus 11 is representative of the enable (ALE), read (RD) and write (WR) signals described in the INTEL publication noted above and includes an additional signal lead CS. The CS signal lead increases the number of circuits that microprocessor controller 202 can address.

Interface 10 also includes an address decoder which is enabled by microprocessor controller 202 via lead ALE to accept address information from bus MD via bus 9 to allow microprocessor controller 202 access to board address latch 65, status latch 45 or sanity controller 70 via bus MB0 and microprocessor interface 10. An access enable lead (WREN, not shown in FIG. 2) to each circuit 70, 45 and 30 that is activated by microprocessor controller 202 is also a part of bus MB0.

Microprocessor interface 10 input bus MBI is representative of a multiple lead bus connecting a microprocessor interface 10 selector circuit to the eight bits of status information outputted by status latch 45 and forty-eight outputs from TDB input 20 consisting of six groups of data of eight bits each. The output from TDB input 20 comprises eight bits of data accepted from bus 321 and bus 322 for each time slot 0-4. The first and second group of eight bits are representative of the board address received from either bus 321 or bus 322, or both, and the succeeding four groups of eight bits of data each represent control information passed from a call processor to microprocessor controller 202 during time slots 1-4. Interface 10 also includes three eight bit data latches for storing control data supplied by microprocessor controller 202.

As mentioned above, microprocessor interface 10 includes a selector circuit connecting to bus MBI. Microprocessor controller 202 accesses bus MBI via microprocessor interface 10 address decoder and selector circuits. Each group of eight leads of bus MBI is represented by an address which is decoded by an interface 10 decoder circuit. The decoded address then directs an interface 10 selector circuit to output via bus MD the selected group of eight MBI leads. It is recognized by the art that an eight bit bus could be substituted for bus MBI and the outputs from latch 65 and TDB input 20 could be multiplexed onto the eight bit bus MBI in groups of eight bits. The multilead arrangement described herein was selected over the multiplexed arrangement to provide speed and reduce propagation delays.

Microprocessor interface 10 decoder also decodes microprocessor controller 202 address information received via bus MD into a one out of three selection of bus OL leads connecting to TDB output circuit 30 via multilead bus MB0. A microprocessor controller 202 address of the OL leads causes interface 10 to also activate an enable lead (WREN, not shown in FIG. 2) to TDB output circuit 30. The selection of OL leads one at a time by microprocessor controller 202 via interface 10 causes eight bits of control data stored in the three registers discussed above to be loaded onto bus MB0 which is accepted by output circuit 30 via bus 31 for storage in parallel load serial shift registers, as will be explained more fully herein.

BUS PROTOCOL

Time slots 0-4 of bus 321 or bus 322 are reserved for passing information between a call processor and control channel interface 203. Other communications, such as voice and data information between port circuits, such as port circuit 200-1 (FIG. 1), use bus 321 or bus 322 during succeeding time slots (5-255). Such information as voice and port data occurring during time slots 0-4 is considered invalid.

Of time slots 0-4, time slot 0 is reserved for passing a control channel interface 203 local board address or group address. A group address is distinguished from a local board address when bit 7 of bus 321 or bus 322 connecting to system bus A and B via bus buffers 204 and 205, respectively, is set to a one during time slot zero. A group address is part of a call processor polling request to a specific group of control channel interface circuits 203 in which the group address is defined by bus 321 or bus 322 bits 3-6. The type of poll or acitivity request is defined by bits 0-2, and is typically, uplink message request (ACT), sanity status (SAN) or restart microprocessor controller 202 (RST). The first two call processor group requests require a response from each control channel interface 203 within the group, whereas the last request (RST) requires no response but directs circuit 203 to perform a function. Microprocessor controller 202 is also interrupted via interrupt circuit 15 in the event a group activity request is not one of the activity requests (ACT, SAN or RST) described above.

Control messages loaded into TDB output latch 30 by local processor 202 via interface 10 are transmitted uplink to a local processor following a group activity scan (polling request). A call processor notifies microprocessor controller 202 via control channel interface circuit 203 to transmit uplink messages by sending that circuit's address (CCI 203 board address) during time slot zero of bus 321 or bus 322 and by sending coded signals in frame time slots 1 and 2 which alert microprocessor controller 202 to transmit during a next frame via circuit 203.

Microprocessor controller 202 transmits uplink during succeeding frames upon circuit 203 recognizing its address on bus 321 or bus 322 during time slot zero. The first uplink message transmitted by microprocessor controller 202 via control channel interface 203 is coded to alert a call processor to the number of uplink messages it should expect. As mentioned above, control channel interface uses time slots one to four for the transmission and reception of messages to and from a call processor.

When not transmitting messages, control channel interface 203 accepts control messages or polling requests appearing on bus 321 or bus 322 during time slots 1–4 upon detecting its address on bus 321 or bus 322 during the proceding time slot zero.

BOARD ADDRESS

A board address for each control channel interface circuit 203 is established by connecting certain of the seven back plane wiring pins (not shown) to either ground or plus five volts representing binary ones and zeros. The seven back plane pins (not shown) which connect to board address latch 65 (FIG. 2) are latched into seven corresponding D-type flip-flops accessed by microprocessor controller 202 via interface 10. Bits 3–6 of the board address establish the circuit 203 group address and bits 0–2 establish a local address.

The board address extends to control address decoder 55 and reply circuit 60 via board address bus BD0–BD6, respectively. The board address BD0–BD6 is also supplied to local processor 220 via seven bit bus BD0–BD6 via interface circuit 10 upon being enabled by MI 10 address decoder circuit via lead AE.

CONTROL ADDRESS DECODER

As shown in FIG. 2, control address decoder 55 is a circuit for decoding information appearing on bus 321 or bus 322 during time slot zero. The eight bit address information is latched into TDB input circuit 20 from either bus 321 or bus 322 and is supplied to decoder 55 via sixteen bit bus B0. The first eight bits of bus B0 are reserved for address information accepted from bus 321 and the second eight bits are reserved for bus 322 address information.

A time slot 0 address relating to a group polling request (bit 7=1) causes decoder 55 to compare the group address (bits 3–6) to the group address supplied to it from board address latch 65 via board address bus BD0–BD6, in which the group address is defined by bits BD3–BD6. If the comparison agrees decoder 55 alerts controller 50 via lead MADA or lead MADB of bus 56 if the time slot 0 information originated from either bus 321 or 322, respectively. Decoder 55 also decodes bits 0–2 originating from either bus 321 or bus 322 to determine the type of call processor group request and activates either lead LADA or LADB of bus 56 to controller 50 as a means of indicating to that circuit that a call processor group scan (group polling request) has occurred. The decoded request (bits 0–2) is supplied to controller 50 via either lead ACTA or lead ACTB of bus 56 if an activity (uplink message request) request, via lead RPA or lead RPB of bus 56 if requested to restart microprocessor controller 202 or via lead SNA or lead SNB of bus 56 if a sanity request is made. An active MADA or MADB lead on bus 56 without an active request lead (ACTA or ACTB, respectively) is not valid and controller 50 causes interrupt circuit 15 to interrupt local processor 202 via lead SINT of controller 50 control bus.

A time slot 0 address not relating to a call processor polling request (bit 7=0) is compared against address bits BD0–BD6 supplied by latch 65. If the address comparison disagrees control channel interface 203 ignores the control information contained on bus 321 or bus 322 time slots 1–4, otherwise decoder 55 notifies controller 50 by activating lead MADA or lead MADB as an indication that the group address (bits 3–6) compares and activates lead LADA or lead LADB as an indication that the local address (bits 0–2) compares, with respect to bus 321 or bus 322.

REPLY CIRCUIT

A control channel interface 203 reply to a call processor group activity or sanity request occurs during time slot 2 immediately following a time slot 0 group polling request (a group reply to a call processor request is made by each interface circuit 203 within the polled group by setting its corresponding local address bit position on bus 321 or bus 322 to a zero). In this manner, a call processor sets bits 0–7 of bus 321 or bus 322 to a one during time slot two which are then cleared by corresponding replying circuits 203, according to their respective address bit positions.

For example, control channel interface circuit 203 having a local address of 3 and having control information to transmit clears bit 3 of bus 321 or bus 322 during time slot 2 as a positive reply to a call processor group activity request, otherwise bit 3 remains unchanged.

Reply circuit 60 is a circuit for forming a control channel interface 203 reply to a call processor group request based on the logic state of either the activity lead ACT supplied by status latch 45 or sanity lead SB supplied by sanity control 70. As discussed above, decoder 55 decodes the particular call processor request and notifies controller 50 as described. Controller 50 directs reply circuit 60 via either lead PCT (activity request) or lead PSN (sanity request) to form the respective reply. For a call processor activity request, reply circuit 60 uses the activity status supplied by status latch 45 via lead ACT and arranges the logic state appearing on that lead in bit position order based on the local board address supplied by address latch 65 via bus BD0–BD6. For a sanity or operability request, reply circuit 60 arranges the logic state appearing on lead SB supplied by sanity control 70 in a like manner.

Upon forming a reply, reply circuit 60 inserts the formed response into the selector circuit of output circuit 30 via bus SS0–SS7. Output circuit 30 transfers the contents of its selector circuit to either bus 321 or bus 322 during time slot 2 at the direction of controller 50.

STATUS LATCH

Status latch 45 is a combinational circuit consisting of six D-type flip-flops and two set-reset (S/R) type flip-flops. Each S/R register is set and cleared by a specific address supplied by microprocessor controller 202 via MI 10.

The S/R registers store bits ABE and BBE supplied by microprocessor controller 202 via MI 10 and multilead bus MB0 for controlling access to either bus 321 or bus 322, respectively.

A first status latch 45 D-type flip-flop (ACT) is set (high) by microprocessor controller 202 whenever uplink messages have been stored by microprocessor controller 202 in output latch 30 via MI 10 and bus MB0. The ACT flip-flop is cleared by microprocessor controller 202 via MI 10 when microprocessor controller 202 completes transmission of all pending uplink control messages.

A second status latch 45 D-type flip-flop stores a microprocessor controller 202 interrupt bit TSI which is supplied to controller 50 for notifying microprocessor controller 202 via circuit 15 whenever a new system frame is started. The TSI flip-flop is set and cleared by microprocessor controller 202 via MI 10 and bus MB0.

Third and fourth status latch 45 D-type flip-flops ASCN, BSCN are set by controller 50 whenever controller 50 receives a group activity request (discussed above) via bus 321 or bus 322, respectively. The ASCN and BSCN bits are read and cleared by microprocessor controller 202 via MI 10 as described above.

Fifth and sixth status latch 45 D-type flip-flops ACA, ACB are set by controller 50 whenever an address appearing on either bus 321 or bus 322, respectively, during TS0 compares with the board address supplied by address latch 65. Controller 50 clears the respective bit ACA or ACB at the end of time slot 255.

CONTROLLER 50

Figure 3:
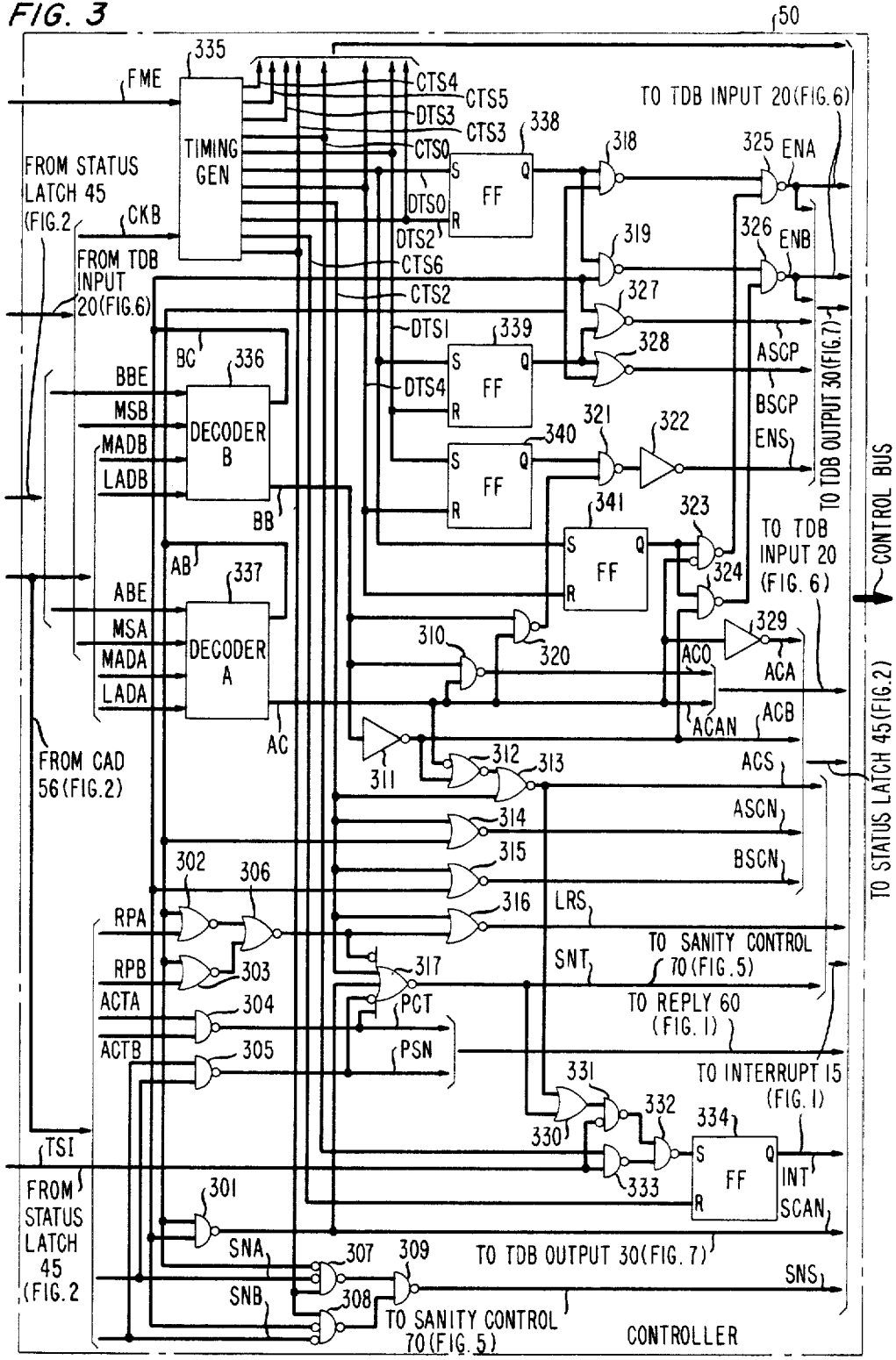
FIG. 3 is a detailed diagram of a controller circuit used in the invention.

Referring to FIG. 3, there is shown controller 50 which is a state driven circuit. Controller 50, in response to inputs supplied by control address decoder 55 via multilead bus 56 and inputs supplied by TDB input 20 via leads MSA and MSB operates to decide whether control channel interface 203 should transmit or accept information from either bus 321 or bus 322. As mentioned above, microprocessor controller 202 sets either bit ABE or BBE in status latch 45 as a means of selecting bus 321 or bus 322 to be active, respectively. Status bits ABE, BBE, and TSI are supplied to controller 50 via leads ABE, BBE, and TSI, respectively. With respect to an active (logic 1) ABE lead or BBE lead controller 50 activates either output lead ENA or lead ENB respectively in combination with the inputs discussed above.

Controller 50 logic shown in FIG. 3 is also used to interrupt microprocessor controller 202 via interrupt circuit 15 whenever controller 50 detects an undefined call processor group polling request based on the inputs supplied from decoder 55 and outputs via lead SNT a logic 1 pulse during time slot 3. Lead SNT connects to interrupt circuit 15 (FIG. 2) via the control lead and bus 16 which causes that circuit to interrupt microprocessor controller 202.

Microprocessor controller 202 will also be interrupted by controller 50 at the start of each system frame when the TSI bit of status latch 45 is set by microprocessor controller 202 via MI 10 and multilead bus MB0. The state of the TSI bit is supplied to controller 50 from status latch 45 via lead TSI. Lead TSI active (logic 1) causes controller 50 to pulse lead INT connecting to interrupt circuit 15 via controller 50 control bus and lead 16 during system time slots 0-5.

Controller 50, in response to a call processor group sanity request outputted by decoder 55 via lead SNA or lead SNB of bus 56 activates output lead SNS (logic zero) of controller 50 control bus connecting to sanity control circuit 70 via bus 71 during time slot 3. Controller 50 also activates output lead LRS (logic one) of the control bus connecting to circuit 70 via bus 71 whenever control channel interface circuit 203 receives instructions to restart microprocessor controller 202 (leads RPA or RPB of bus 56) as mentioned above. The response of sanity control circuit 70 to either an active lead SNS or to an active lead LRS will be discussed shortly.

Controller 50 decoders A and B decode inputs supplied by decoder circuit 55; decode bus 321 and bus 322 activity bits ABE, BBE supplied by status latch 45, via leads ABE, BBE, respectively; and serve to decode the most significant bits (bit 7) of busses 321 and 322 supplied by TDB input 20 via leads MSA and MSB, respectively. Thus TDB input 20 accepts information from bus 321 or bus 322 based on the states of the active bus bits ABE or BBE, respectively. For example, if bit ABE inputted to controller 50 decoder A from status latch 45 via lead ABE is at a logic one controller 50 decoder A is active. Under special circumstances microprocessor controller 202 will set bits ABE and BBE to determine which system bus, bus A or bus B, is being used by a call processor.

Decoder A (B) outputs via port AC (BC) a logic zero when the inputs LADA, MADA (LADB, MADB) of bus 56 indicate that a correct address appears on bus 321 (322) during time slot 0. Decoder A (B) also outputs via port (BB) a logic zero when the combination of inputs LADA, MADA and MSA (LADB, MADB and MSB) indicate that the information appearing on bus 321 (322) during time slot zero pertains to a group polling requests.

In response to decoder A (B) outputs AC and AB (BC and BB) controller 50 generates a series of outputs as follows.

ENS—a high going pulse bridging the middle of time slot 1 to the middle of time slot 5 for enabling TDB output 30 shift registers and output control logic (OCL).

ENA (ENB)—a high going pulse bridging the middle of time slot 1 to the middle of time slot 5 when the address contained on bus 321 (322) is correct and is supplied to TDB output 30 via controller 50 control bus for selecting either bus 321 or bus 322 with respect to the logic state of input leads ABE, BBE, respectively.

ACA (ACB)—a logic one when the address appearing on bus 321 (322) during time slot 0 is correct and is used for setting status bit ACA (ACB) in status latch 45 via controller 50 control bus.

ACAN—the complement of lead ACA (logic zero) supplied to TDB input buffer 20 via controller 50 control bus.

ACO—logic one when the full board address appears on either bus 321 or bus 322 and is supplied to TDB input 20 via controller 50 control bus.

ASCN (BSCN)—a logic one pulse generated during time slot 3 in response to a group polling request appearing on bus 321 (322) during time slot zero and is supplied to status latch 45 via controller 50 control bus.

ASCP (BSCP)—a logic one pulse bridging the middle of time slot one to the middle of time slot two for enabling TDB output 30 has drivers 719-0 to 719-7 (720-0 to 720-7) during time slot 2 in order to transmit a polling (activity scan) reply.

SCAN—a logic one output when a group polling request is detected on either bus 321 or 322 and is supplied to TDB OUTPUT 30 selector circuits via controller 50 control bus.

PCT—a logic one output when a group polling request is detected on either bus 321 or bus 322 and is supplied to reply circuit 60 via controller 50 control bus to form the activity reply (discussed above).

PSA—logic one output when a group sanity request is detected on either bus 321 or 322 and supplied to reply circuit 60 via controller 50 control bus to form the sanity reply (discussed above).

Controller 50 timing generator 335 in response to a system frame pulse supplied via lead FME and a buffered system clock signal supplied by TDB input 20 via lead CKB generates a series of time slots pulses.

Figure 4:
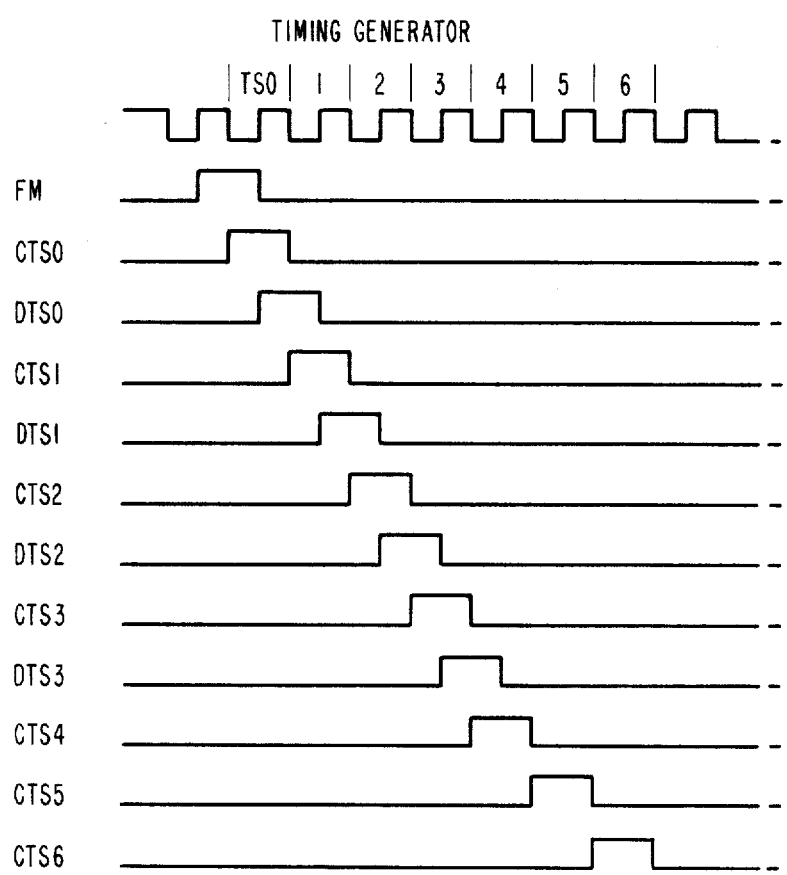
FIG. 4 illustrates a series of clock signals produced by the controller circuit which are sequenced with respect to a system frame and system time slots.

Briefly referring to FIG. 4, there is shown an array of pulses, CTS0–CTS6 and DTS0–DTS4, produced by controller 90 timing generator 335. Time slot pulses CTS0–CTS6 correspond to system time slots and delayed time slot pulses DTS0–DTS4 are delayed one-half of a time slot with respect to time slots CTS0–CTS4. The pulses shown in FIG. 4 control the reception and transmission of control information via circuits 20 and 30 (as will be described) as well as control a portion of the output pulses outputted by controller 50 as described above.

The outputs produced by controller 50 with respect to the input from decoder 55 discussed above can be readily described by the state diagram shown in FIG. 8 in which a column of inputs correspond to a column of outputs and in which a logic one is represented by a one (1), a logic zero is represented by a zero (0), and a don't care is represented by a dash (-).

SANITY CONTROL

Figure 5:
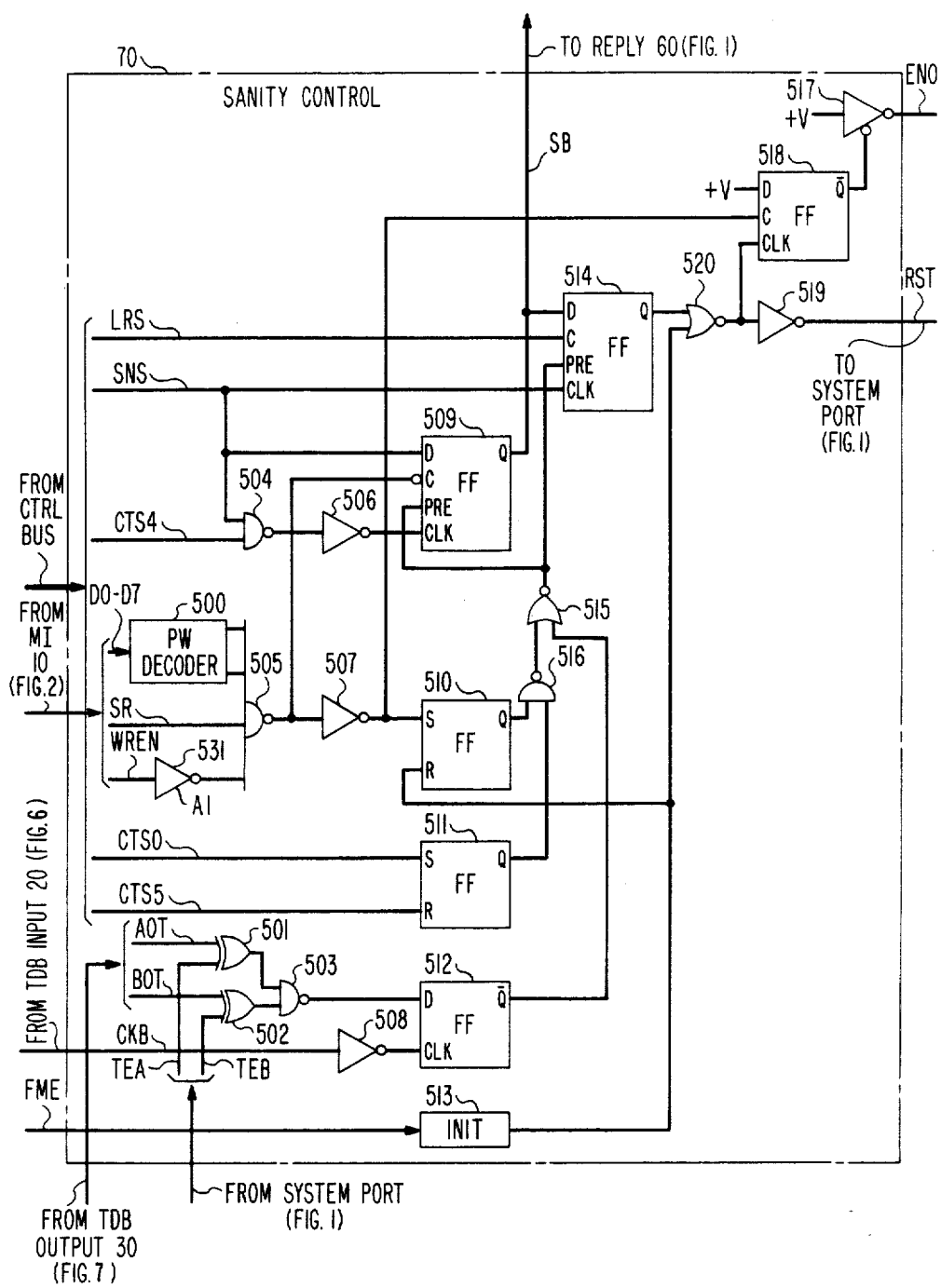
FIG. 5 illustrates a sanity control circuit which monitors the operability of a respective distributed processor.

Referring to FIG. 5, there is shown a detailed drawing of sanity control circuit 70 which monitors the operability of microprocessor controller 202 and port circuit elements (FIG. 1), such as station interface 200-1, and locks out transmit access to system bus A or bus B upon detecting transmission to bus A or bus B by a port circuit element during control time slots 0–4.

The operability of microprocessor controller 202 is monitored by setting register 509 upon receiving a group sanity scan request from a central processor (discussed above) and monitoring whether register 509 is cleared by microprocessor controller 202 before the next group sanity scan occurs. A microprocessor controller 202 failure to reset register 509 results in control circuit 70 disablement of microprocessor controller 202 via lead RST as well as placing the bus buffers in a receive only mode via lead ENO. The receive only mode prevents transmission to system bus A and bus B via bus buffer 204 or buffer 205, respectively, but allows CCI 203 to receive instructions from a call processor to restart an inhibited, or malfunctioning, microprocessor controller 202.

Sanity control circuit 70 also monitors leads TEA and TEB (FIGS. 1 and 2) to determine if a corresponding port station circuit, such as station circuit 200-1 shown in FIG. 1, is transmitting to system bus A or bus B via buffers 204,205 during control time slots (TS0–TS4). Port station circuits other than a control channel interface circuit 203 are restricted from transmitting to either system bus A or bus B during control time slots (TS0–TS4).

Transmission to system bus A or bus B during control time slots by a port station circuit other than by circuit 203 is recognized as an error and circuit 203 inhibits bus buffers 204, 205 via lead ENO (FIG. 1) to prevent further transmissions.

As discussed above, a group sanity scan is processed by controller 50 and address decoder 55. Upon receiving a group scan request from a central processing unit, controller 50 causes lead SNS to go high (logic state 1) and the leading edge of that signal clocks the output of register 509 into register 514 in which the low signal clocked into register 511 is outputted to nor gate 520. The output from gate 520 is a high which is then inverted to a low logic signal by inverter 519 causing the logic state of lead RST to be a low. A logic zero (low) on lead RST permits microprocessor controller 202 to operate in a normal manner.

Continuing with FIG. 5, the logic one on lead SNS is clocked into register 509 by a positive pulse supplied by controller 50 via lead CTS4 of controller 50 control bus during time slot four. The positive signals on leads SNS and CTS4 causes the output of NAND gate 504 to go low which is inverted by inverter 506 and inputted to the clock terminal of register 509. Thus, a logic one level on lead SNS is clocked into register 509 and is presented as a high signal at terminal Q of register 509 and is also presented to reply circuit 60 via lead SB.

Microprocessor controller 202 clears register 509 by presenting to password decoder (PW) an eight bit password via microprocessor interface circuit 10 and leads D0–D7 of bus MB0. The digital password is decoded by decoder 500 and if the password is correct the two outputs of decoder 500 connecting to NAND gate 505 go high. A correct password in combination with a high on lead SR and a low on lead WREN supplied by microprocessor controller 202 via MI 10 and bus MB0 causes the output of gate 505 to to low clearing register 509 via that register's inverting input. The output from gate 505 when at a low logic state also clears register 518 via inverter 507. Register 518 in a cleared state outputs a high signal (logic one) at terminal $\overline{Q}$ which connects to the inverting input of tri-state gate 517 causing the output of tri-state Gate 517 (having an external pull-up resistor not shown) connected to lead ENO to be a high. A high on lead ENO permits bus buffers 204 and 205 (FIG. 1) to operate in a normal manner.

In the event microprocessor controller 202 fails to clear register 509 before the next central processor sanity scan, the high signal outputted at the Q terminal of register 509 is clocked into register 514 upon lead SNS going high. The high signal clocked into register 514 is outputted via terminal Q of register 514 and connects to nor gate 520 causing the output of gate 520 to go low. The low signal outputted by gate 520 is inverted by inverter 519 which inhibits microprocessor controller 202 from operating via lead RST and also causes the +V volts, representing a logic one, connected to the D terminal of register 518 to be clocked into that register where it appears as a low signal at the $\overline{Q}$ output of register 518. The output of register 518 connected to the inverting input of gate 517 is reflected as a low signal on lead ENO which disables bus buffers 204 and 205 (FIG. 1) from transmitting to system bus A and system bus B.

Leads AOT and BOT supplied by TDB output circuit 30 are normally high and go low when control channel interface 203 transmits to system bus A or system bus B. Leads TEA and TEB connecting to each system port element (FIG. 1) are normally high and go low when bus buffers 204 and 205 are enabled by a system port element, such as element 200-1 of FIG. 1.

Lead CKB supplied by TDB input 20 is pulsed during each system control time slot.

Continuing with FIG. 5, a high on lead AOT (BOT) in combination with a low on lead TEA (TEB) causes exclusive or gate 501 (502) to output a low signal to NAND gate 503 indicating an error condition. The high signal outputted by gate 503 connected to register 512 is clocked into register 512 by clock pulses appearing on lead CKB during control time slots. Register 512 outputs a low signal from its $\bar{Q}$ terminal to nor gate 515. Gate 515 in turn outputs a high signal which forces registers 501 and 514 to output a high signal at their respective Q terminals. The high signal outputted by register 514 inhibits microprocessor controller 202 and disables bus buffers 204, 205 from transmitting, via leads RST and ENO, respectively, as discussed above.

Initialization circuit 513 is a circuit which inhibits microprocessor controller 202 during the first two system frames after a system initialization as a means of temporarily disabling microprocessor controller 202 immediately following the application of power to system port 200. Thereafter, circuit 513 removes the inhibit from lead RST on the occurrence of the third system frame. In this manner, microprocessor controller 202 is held inoperable until system timing and power voltages have stabilized.

TDB INPUT 20

Figure 6:
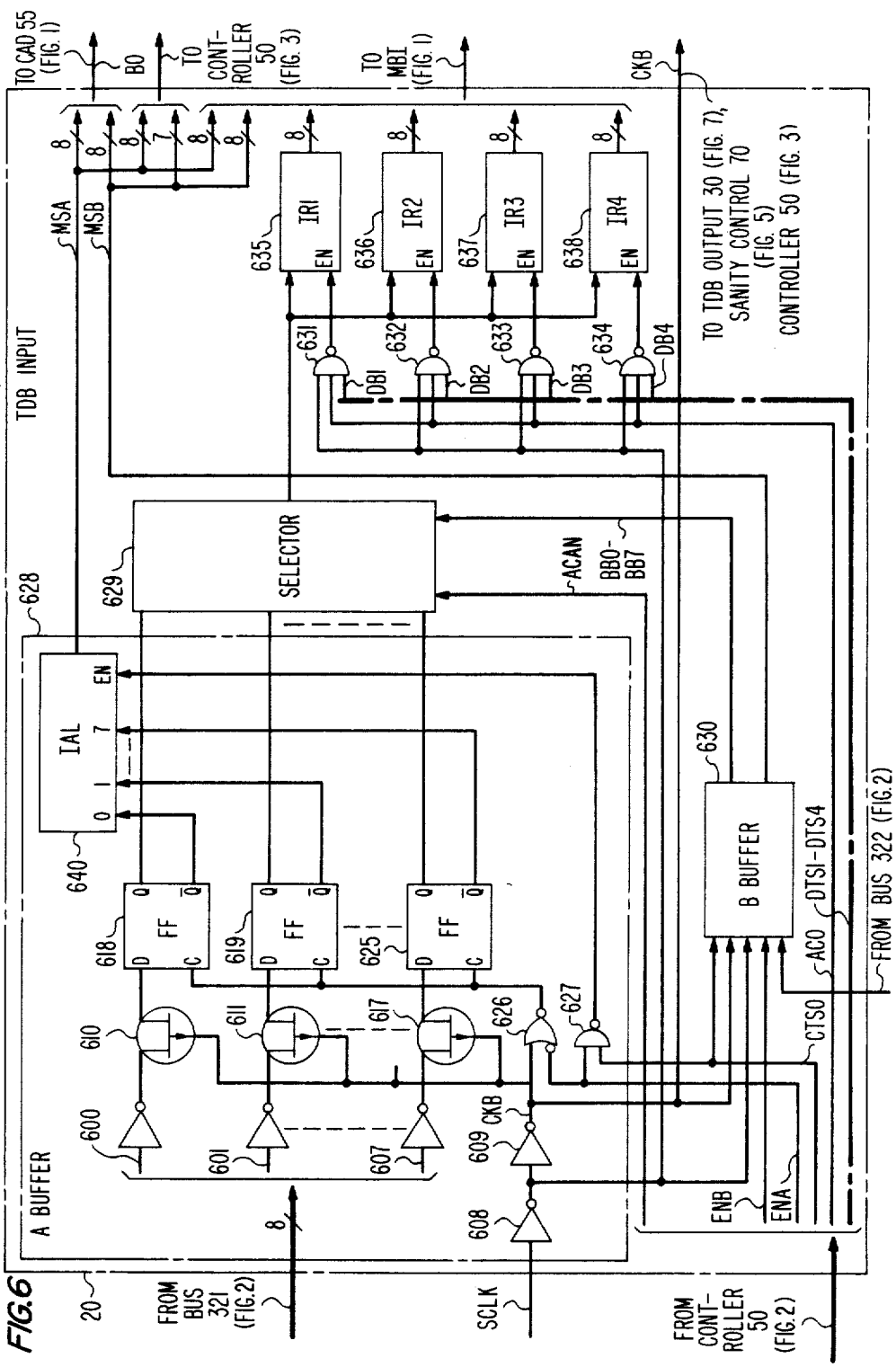
FIG. 6 illustrates a bus input circuit which accepts control information from a system bus under control of the controller circuit.

Referring now to FIG. 6, there is shown a detailed block diagram of TDB input circuit 20. TDB input 20 consists of two groups of input latches and transmission gates (A buffer 628 and B buffer 630) which connect to busses 321 and 322, respectively. Circuit 20 also includes eight bit selector circuit 629 for selecting between data received from bus 321 (A buffer) or bus 322 (B buffer) during time slots 1-4. The eight bits of control data passing through selector 629 are latched into eight bit registers 635-638 during time slots 1-4, respectively. Address data which is transmitted by a call processor during time slot 0 is automatically accepted by input circuit 20 from bus 321 and stored in address register 640. As discussed above, address data is automatically supplied to control address decoder 55 via bus B0. In a like manner, address data is automatically accepted from bus 322 and stored in B-bus interface 630. Address data stored in B buffer interface 630 is also automatically supplied to address decoder 55. Since A buffer interface circuit 628 is identical to B buffer interface circuit 630, a description of A buffer interface circuit will equally pertain to B buffer interface circuit.

Circuit 20 continuously monitors data busses 321 and 322 but only accepts data from those busses during control time slots TS0-TS4.

The eight bits of data appearing on bus 321 during time slots TS0-TS4 are transferred to FET transistor transmission gates 610-617 via bus amplifiers 600-607 on the falling edge of the two megahertz system clock pulse SCLK supplied by a call processor (not shown), which is double buffered by inverters 608 and 609 and supplied to CCI 203 circuits via lead CKB. Assuming that system bus A (B) is the active bus, bus enable lead ENA (ENB) from controller 50 will be active high (logic one). Lead ENA connecting to the inverting input of NOR gate 626 causes the output of that gate to be high removing a clear signal connecting to the C terminals of D-type latches 618-625. On the rising edge of system clock signal SCLK the information stored in transmission gates 610-617 is transferred to latches 618-625, respectively.

The data accepted from bus 321 (322) during time slot 0 is transferred from the $\bar{Q}$ terminals of latches 618-625 to eight bit input address register 640 upon being enabled by NAND gate 627 on the rising edge of signal CTS0 supplied by controller 50 timing generator via controller 50 control bus. The eight bits of address is supplied from the output of register 640 to decoder 55 via bus B0 and to MI 10 via bus MBI for processing as discussed above.

If the address accepted from bus 321 (322) compares with the board address, as discussed, controller 50 activates lead ACAN supplied via controller 50 control bus allowing selector 629 to accept the Q outputs from A buffer 628 (B buffer 630).

On the falling edge of clock signal CTS0 from controller 50 the output of NOR gate 626 goes high (logic one) clearing latches 618-625 thereby allowing the information appearing on bus 321 (322) during the next four time slots (TS1-TS4 shown in FIG. 4) to be latched into latches 618-625 and transferred to registers 635-638 via selector 629. Information appearing on bus 321 (322) is latched in register 635 (636-638) when enabled by NAND gate 631 (632-634). The output from NAND gate 631 (632-634) connecting to the EN terminal of eight bit register 635 (636-638) goes low on the rising edge of delayed time slot 1 (2-4) appearing on lead DTS1 (DTS2-DTS4) from controller 50, when buffered clock signal CKB goes high and when lead ACO from controller 50 is active (high).

The eight bit outputs from registers 635-638 are presented in microprocessor interface circuit 10 via bus MBI as discussed above. Address information from A buffer 628 and B buffer 630 is also presented to microprocessor interface circuit 10 via bus MBI as well as to address decoder 55 via bus B0. In addition, bit 7, the most significant bit of address information from A buffer 628 and B buffer 630 is presented to controller 50 for processing as discussed above.

TDB OUTPUT CIRCUIT

Figure 7:
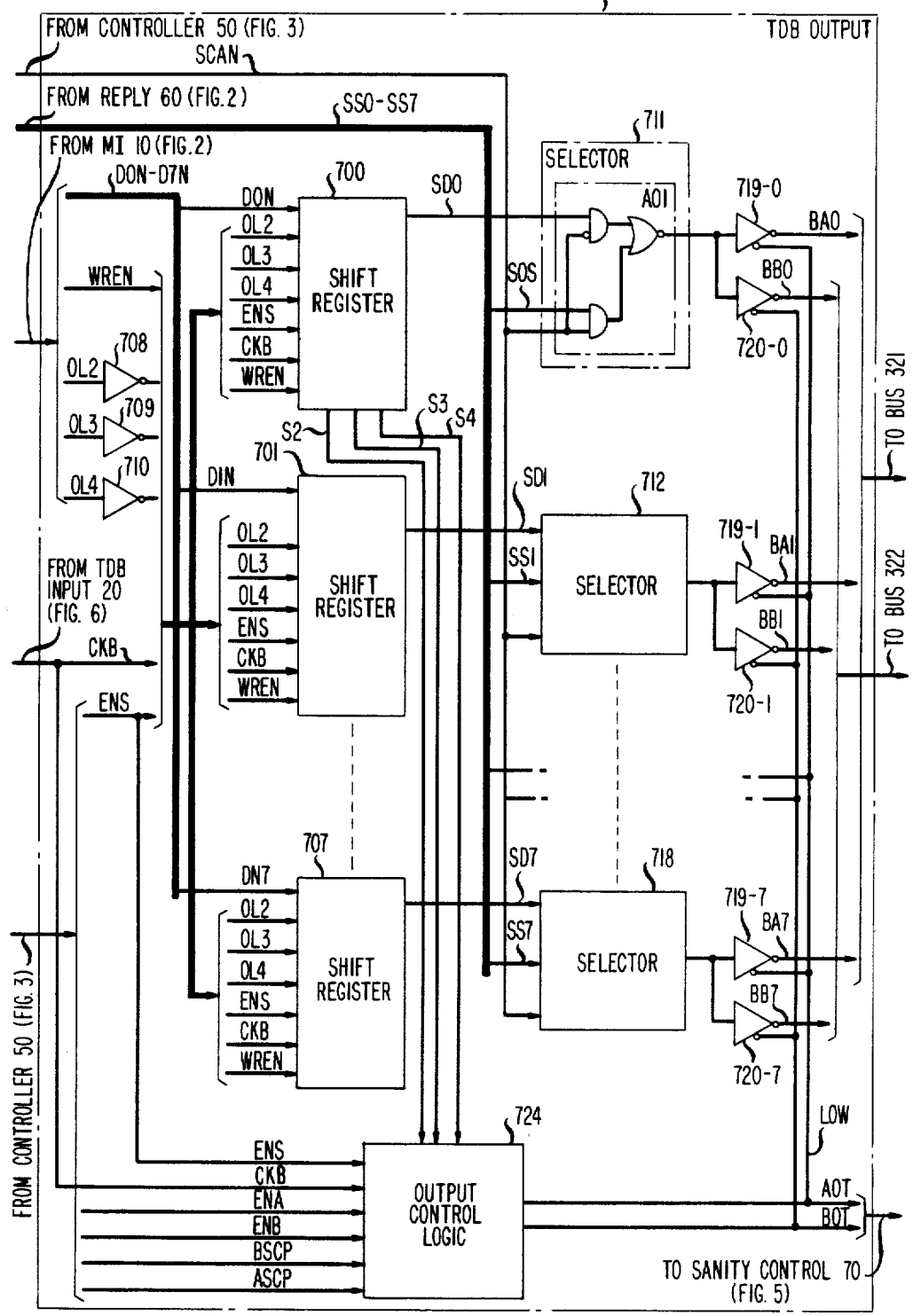
FIG. 7 illustrates a bus output circuit which transmits control information to a system bus under control of the controller circuit.

Referring now to FIG. 7, there is shown therein a detailed block diagram of TDB output circuit 30. Data leads D0N-D7N connect to bus MB0 for accepting and latching into registers 700-707 eight bits at control data. Registers 700-707 each have three latch circuits arranged as a parallel input serial output shift register. In this manner, three groups of eight bits each of control data is loaded into registers 700-707 and outputted to bus 321 or bus 322 during time slots 2-4, respectively, via data selectors 711-718 and tri-state bus drivers 719-0-719-7, or 720-0-720-7, respectively.

Microprocessor controller 202 leads output circuit 30 with three groups of eight bits of data each by causing microprocessor interface 10 address decoder to select each of the three leads OL2-OL4 of multilead bus MB0 one at a time. Interface 10 activates one of the three OL leads (OL2-OL4), corresponding to time slots 2-4, respectively, by causing the selected lead to go high (logic 1) and causing lead WREN (enable) of bus MB0 to go low (logic 0). The logic value on a particular OL2-OL4 lead is complemented by corresponding inverting amplifiers 708-710, which connect to each of the registers 700-707. Buffered system clock SCLK lead CKB from TDB input 20, enable lead WREN and data leads D0N-D7N of bus MB0 also connect to each of the registers 700-707.

Each register 700-707 stores three bits of data supplied by corresponding data leads D0N-D7N of bus MB0. For example, each of the three latch circuits of register 700 stores one bit of data representing data bit 0 for outputting to lead BA0 (BB0) of bus 321 or bus 322 during time slots 2-4, respectively. Each latch of register 700 is consecutively loaded from data lead D0N by the consecutive selection of leads OL2-OL4 when lead WREN of bus MB0 is enabled. In this manner, three consecutive bits of data placed on lead D0N by microprocessor controller 202 via MI 10 is loaded into three consecutive latch circuits of register 700.

Still referring to FIG. 7, data selector circuits 711-718 normally select the outputs from registers 700-707 but can be directed by controller 50 to select data on leads SS0-SS7 supplied by reply circuit 60 for outputting to bus 321 or bus 322. As discussed above, a reply to a call processor group activity request is formed by reply circuit 60 by setting one of the leads SS0-SS7 corresponding to a board address bit position to a logic zero. Controller 50 sets lead SCAN to a logic one state during time slot 2 which directs the response formed by reply circuit 60 to be selected by data selector 711-718 for outputting to bus 321 or bus 322.

As discussed, controller 50 leads ENA and ENB directs circuit 30 output logic control to select which bus, 321 or bus 322, is to receive data from output circuit 30. Data is shifted out of the three latches of each register 700-707 to bus 321 or to bus 322 during enablement of shift lead ENS by controller 50. Lead ENS is enabled (logic one) during the middle of time slot 1 through the middle of time slot 4. In this manner, a data shift window is created on lead ENS during which three bits of data from each register 700-707 is serially outputted on the falling edge of three consecutive system clock signals, supplied via lead CKB from TDB input 20.

TDB output 20 output control logic circuit 724 is a combinational circuit for enabling either bus drivers 719-0-719-7 or 720-0-720-7 for outputting selected control data to either bus 321 or bus 322. Control circuit 724 also directs as to which time slots (2-4) data is transmitted to bus 321 or bus 322. For example, if leads OL3 and OL4 are the only leads activated during the loading of registers 700-707 circuit 24, in response to a logic one state appearing on select leads S3 and S4 only, permits data to be outputted to bus 321 or bus 322 during system time slots 3 and 4 upon receiving an enable shift signal ENS from controller 50 and a clock signal CKB from circuit 20.

Inputs ASCP, BSCP from controller circuit 50 via the control bus cause output control circuit 724 to enable either tri-state bus drivers 719-0 to 719-7 or 720-0 to 720-7 via leads AOT or BOT during time slot 2, respectively, in order to transmit the response formed by reply circuit 60.

Inputs ENA, ENB from controller 50 via the control bus cause output control logic 724 to enable lead AOT to BOT, respectively, during the window created by lead ENS (discussed above) and during the time slot pulses appearing on lead CKB. In this manner, the three bits of data stored in each of the registers 700-707 are clocked into selectors 711-718 and are outputted to bus 321, 322, respectively, during time slots 2-4.

CONCLUSION

It is obvious to one skilled in the art that the invention disclosed herein is not limited to the embodiment disclosed in the accompanying drawings and foregoing detailed description, but can be rearranged through the substitutes, addition and/or deletion of components and function without departing from the scope and spirit of the invention.

For example, a multiplexed eight bit bus can be readily substituted for the multilead bus MBI. Also, a microprocessor could be readily programmed to perform the functions disclosed herein, such as the transmission and reception of information to and from bus 321 or bus 322 as well as monitoring the operability of port circuit elements and microprocessor controller 202.

What is claimed is:

1. An interface circuit for use in a telephone communication system having at least one distributed processor controlling at least one port station circuit, said interface circuit and said one port station circuit being in communication with a central processor over a common bus, said interface circuit interfacing said one distributed processor to said bus, said interface circuit comprising means responsive to requests on said bus from said central processor for applying information from said one distributed processor to said bus, means for monitoring said bus for signals identifying said one distributed processor and accepting central processor information from said bus, and means for establishing access to said bus by said one port station circuit and by said interface circuit such that said access is placed in a read-only mode when said one distributed processor is malfunctioning.

2. The invention set forth in claim 1 wherein said interface circuit includes output storage means comprised of a group of parallel-load-serial-unload shift registers, individual ones of said shift registers corresponding to individual bits on said common bus, said shift registers being used for the storage of distributed processor information.

3. The invention set forth in claim 1 wherein said interface circuit further comprises means for interrupting said distributed processor when said central processor information contained on said common bus is invalid or identifies said distributed processor.

4. The invention set forth in claim 3 wherein said interrupting means includes means responsive to a request from said distributed processor for interrupting said distributed processor at the start of each system frame.

5. A communication system having at least one distributed processor in communication with a central processor over a common bus, said system comprising an interface circuit interposed between said one distributed processor and said bus, means for reserving a group of control time slots of each frame for transferring control information between said one distributed processor and said central processor, storage means having a plurality of memory locations for the storage of information exchanged between said one distributed processor and said central processor over said bus, means responsive to a central processor request contained on said bus during a first one of said group of control time slots for applying said one distributed processor information to said bus during a next said group of control time slots, and means for monitoring said bus during said first one of said group of control time slots for signals identifying said one distributed processor and for accepting central processor information from said bus during next time slots of said group of control time slots for storage in said storage means, said storage means including means for accepting information originating from said interface circuit or information from said one distributed processor for transmission to said bus.

6. An interface circuit for use in a telephone communication system having at least one distributed processor controlling at least one port station circuit, said port station circuit and said interface circuit being in communication with a central processor over a common bus, said interface circuit comprising means responsive to message requests on said bus and supplying information from said one distributed processor to said bus, means for monitoring said bus for signals identifying said one distributed processor and accepting central processor information from said bus, and means for establishing access to said bus by said port station circuit and by said interface such that said access is placed in a read-only mode when said distributed processor is malfunctioning or when said one port station accesses said bus during a bus access time reserved for said interface circuit.

7. The invention set forth in claim 6 wherein said means for establishing includes means for monitoring the operability of said one distributed processor and for disabling it when it is malfunctioning.

8. The invention set forth in claim 6 wherein said identifying signals correspond to a binary address established at said interface circuit by connecting interface circuit terminals to particular voltages representative of binary ones and zeroes.

9. The invention set forth in claim 6 wherein one of said message requests is directed to the status of said distributed processor.

10. The invention set forth in claim 6 wherein another one of said message requests is a request for said distributed processor information.

11. The invention set forth in claim 6 wherein another one of said message requests directs said interface circuit to restart said distributed processor.

12. The invention set forth in claim 6 wherein at least one of said message requests is simultaneously transmitted to a group of interface circuits via said bus and wherein said identifying signals for each of said group of interface circuits corresponds to a bit position on said bus.

13. The invention set forth in claim 6 wherein said interface circuit further includes output storage means, said output storage means being adapted to select either distributed processor information or said one-bit reply for transmission to said common bus.

14. An interface circuit for interfacing a distributed processor to a common bus, said distributed processor exchanging information with a call processor over said bus during a group of control time slots, said interface circuit comprising output storage means having a plurality of memory locations for the storage of distributed processor information, input storage means having a plurality of memory locations for the storage of call processor information, means for accepting information from said common bus during particular ones of said group of control time slots for storage in said input storage means when signals on said bus during a first one of said group of control time slots identifies said distributed port processor, and means for recognizing particular message request signals contained on said bus during said one of said group of control time slots and for transmitting said stored distributed processor information to said bus during a next group of said control time slots, said recognizing means including means for recognizing a particular message request contained on said bus during said first one of said group of control time slots and for applying a one-bit reply in response to said request to said bus.

15. An interface circuit for use in a communication system having at least one distributed processor controlling at least one port station circuit, said interface circuit and said one port station circuit in communication with a call processor over a common bus and said interface circuit interfacing said distributed processor to said bus, comprising means responsive to requests on said bus from said call processor for applying information from said one distributed processor to said bus, means for monitoring said bus for signals identifying said one distributed processor and accepting call processor information from said bus, said monitoring means including means for forming a one-bit reply in response to particular ones of said requests and applying said one-bit reply to said bus, and means for establishing access to said bus by said one port station circuit and by said interface circuit such that said access is placed in a read-only mode when said one distributed port processor is malfunctioning.

16. The invention set forth in claim 15 wherein said interface circuit includes means for generating a first series of signals representative of a group of control time slots and a second series of signals representative of said group of control times slots but delayed by one-half of a time slot for transmitting and accepting information to and from said bus, said control time slots and said delayed control time slots controlling said access to said bus by said interface circuit.

17. The invention set forth in claim 15 wherein said interface circuit further includes output registers for the storage of information from said one distributed processor, said registers being multibit-parallel-load-serial-unload shift registers.

18. The invention set forth in claim 15 wherein ones of said requests identify a group of interface circuits and each interface circuit of said group of interface circuits respond with said one-bit reply.

19. The invention set forth in claim 15 wherein one of said requests is a request to said interface circuit to restart said distributed processor.

20. The invention set forth in claim 15 wherein said one-bit reply is either indicative of the operability of said one distributed processor or is indicative of the status of said one distributed processor information.

21. The invention set forth in claim 15 wherein said interface circuit includes means for selectively outputting to said bus either said one distributed processor information or said one-bit reply.

* * * * *